Jan. 1, 1952 W. P. HENDERSON 2,580,543
COVER PLATE FOR VEHICLE WHEELS
Filed Feb. 25, 1948 3 Sheets-Sheet 1
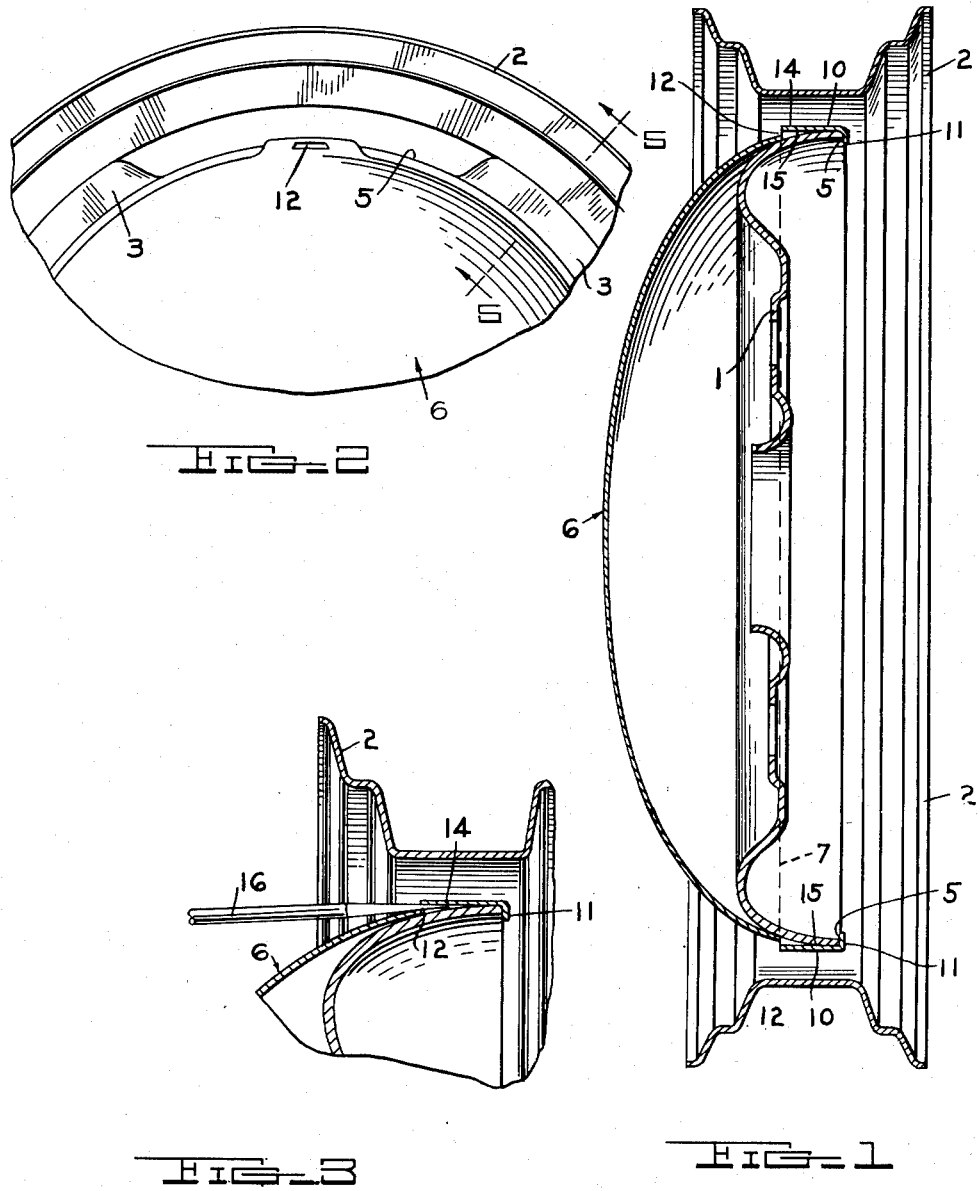
INVENTOR.
WILLIAM P. HENDERSON
BY
Barnes, Kisselle, Laughlin & Raisch
ATTORNEYS

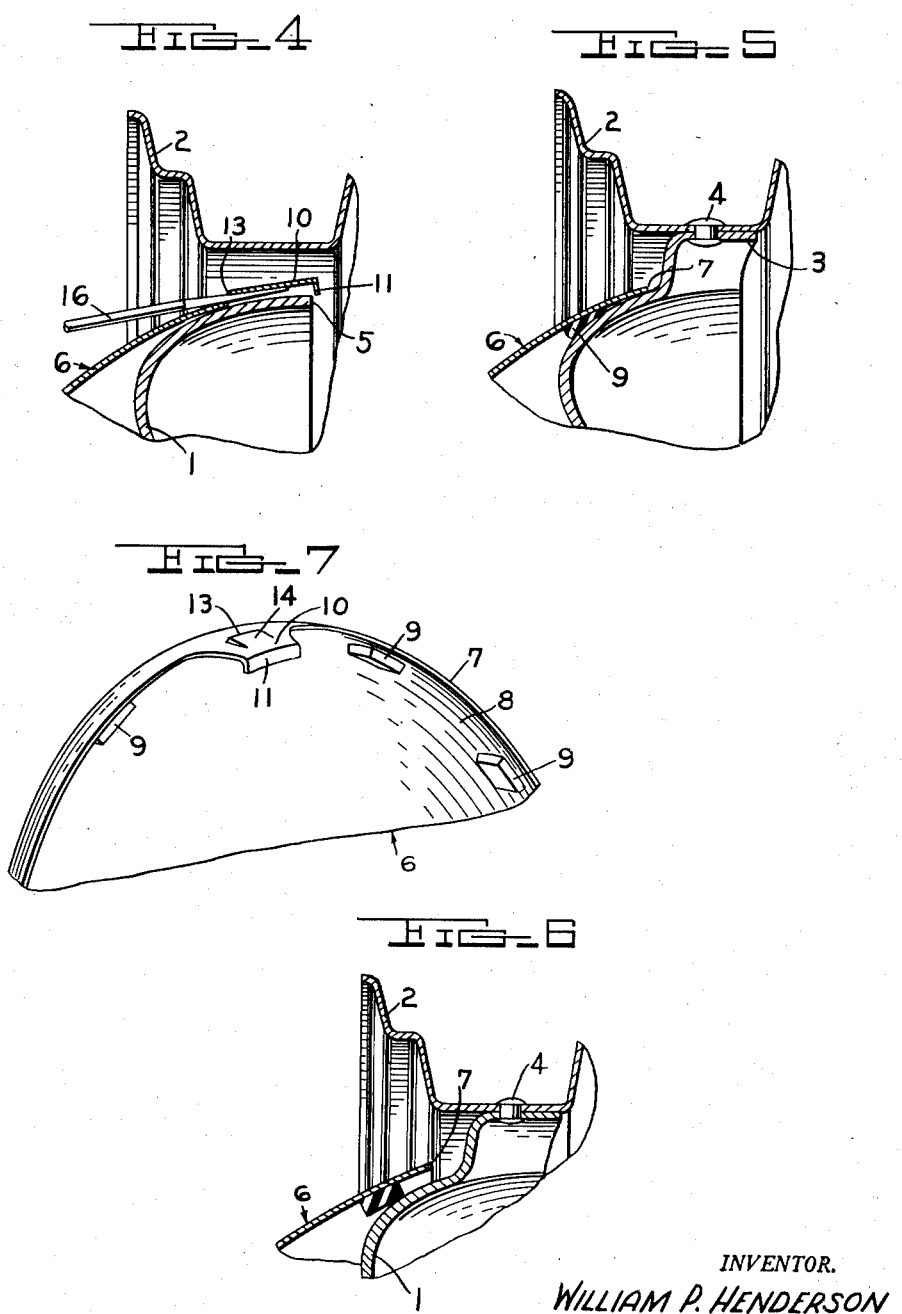

Jan. 1, 1952 W. P. HENDERSON 2,580,543
COVER PLATE FOR VEHICLE WHEELS
Filed Feb. 25, 1948 3 Sheets-Sheet 3
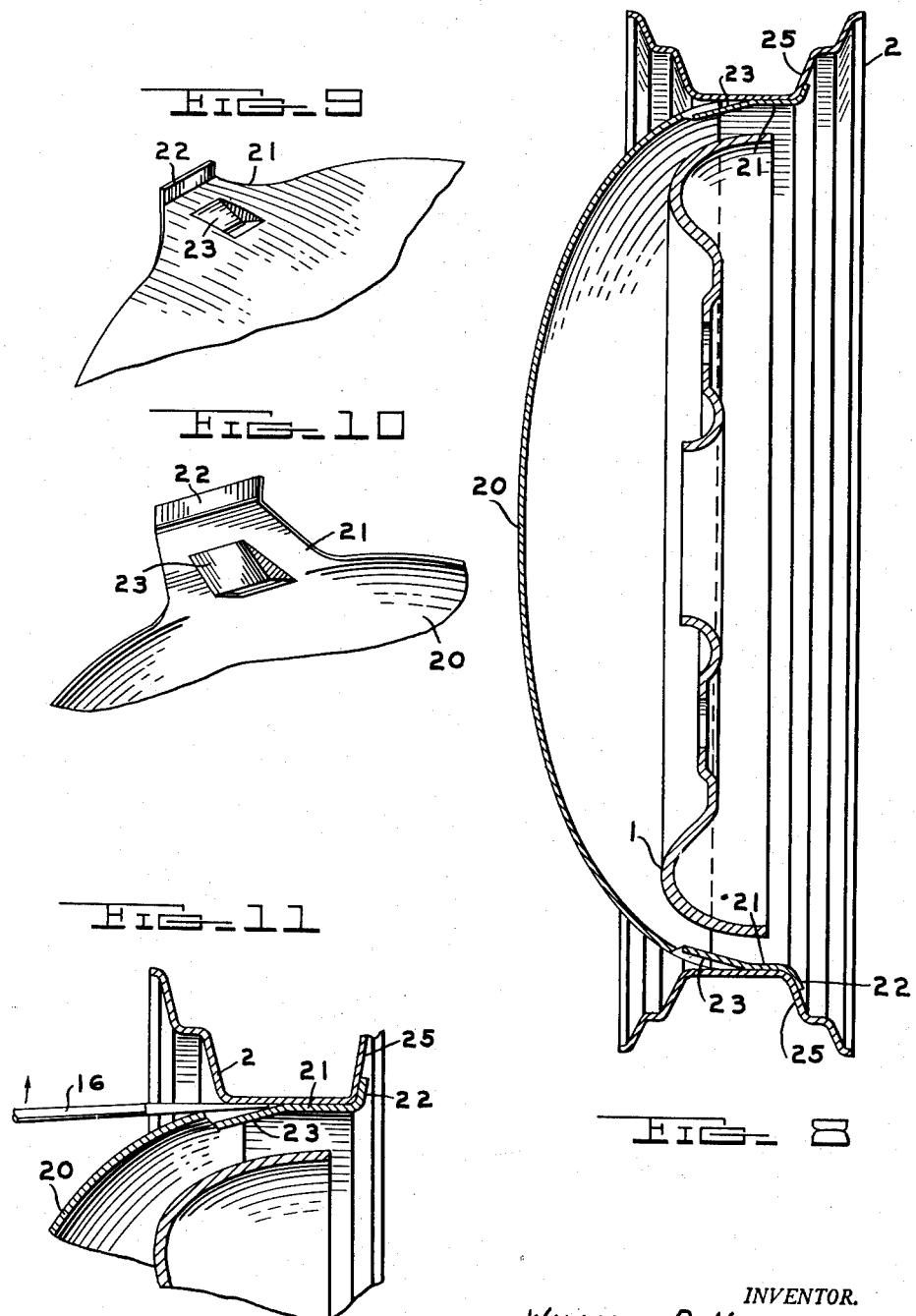
INVENTOR.
WILLIAM P. HENDERSON
BY
Barnes, Kisselle, Laughlin & Raisch
ATTORNEYS Patented Jan. 1, 1952

2,580,543

UNITED STATES PATENT OFFICE 2,580,543

COVER PLATE FOR VEHICLE WHEELS

William P. Henderson, Detroit, Mich.

Application February 25, 1948, Serial No. 10,718

12 Claims. (Cl. 301—37)

This invention relates to a cover plate for a vehicle wheel.

It is common practice to provide vehicle wheels, and in particular automotive vehicle wheels, with cover plates. These cover plates cover all, or a portion of, the wheel body and it has been customary to removably secure these cover plates to the wheel body.

Among the disadvantages of the devices heretofore used for securing the cover to the wheel body is that the cover could only be removed from the wheel with difficulty or would be insecurely held and fall off the wheel while the vehicle was rolling over the highway and in other instances the cover would be held loosely on the wheel and vibrate or rattle, particularly if the vehicle was traveling over a rough spot in the highway.

This invention contemplates a cover plate for a wheel which is easily and expeditiously assembled to and disassembled from the wheel, which is securely releasably fastened to the wheel, which is more economical to produce than the currently used cover plates and fasteners therefor and which will not rattle or jar loose even when the vehicle is traveling over rough road.

Fig. 1 is a vertical section through a vehicle wheel showing my cover assembled thereto.

Fig. 2 is a side view of a portion of a vehicle wheel with my cover plate attached thereto and viewed from the outside of the wheel, that is, from the left hand side of Fig. 1.

Fig. 3 is an enlarged sectional view similar to the upper portion of Fig. 1 and showing a screw driver in position for removal of the cover from the wheel body.

Fig. 4 is a sectional view similar to Fig. 3 but showing the cover plate released from the wheel.

Fig. 5 is a section along the line 5—5 of Fig. 2 with the cover plate secured to the wheel.

Fig. 6 is a view similar to Fig. 5 showing the cover plate released from the wheel body.

Fig. 7 is a fragmentary perspective of the cover plate showing the inside of the same.

Fig. 8 is a vertical section through a vehicle wheel showing a modified cover assembled thereto.

Fig. 9 is a fragmentary view looking at the hook portion of my wheel cover from the outside of the cover.

Fig. 10 is a fragmentary view of the hook portion of my cover as viewed from the inside.

Fig. 11 is a fragmentary view showing an instrument inserted for releasing the cover from the wheel.

Referring more particularly to the drawings, I have shown a wheel comprising a wheel body 1 and a rim 2. The wheel body 1 is provided with a plurality of circumferential flanged portions 3 which engage the inner face of the rim 2 and are riveted thereto by a plurality of rivets 4. The wheel body 1 is provided with circumferential edge portions 5 between the flange portions 3. At least two of the arcuate edge portions 5 will be diametrically positioned as illustrated in Fig. 1.

My cover plate comprises a concave plate 6 which can be stamped or spun from sheet metal such, for example, as sheet steel which has been chromium plated in a conventional manner, or my cover 6 can be spun from stainless steel or made from a resilient plastic material. Cover 6 has vulcanized or cemented along the circumferential edge 7 of the inside face 8, a plurality of resilient pads or cushions 9, preferably of rubber.

The cover 6 is also provided with at least two diametrically opposed tongues 10 which extend generally in a plane perpendicular to the general plane of the cover 6. Each tongue 10 is provided with an inwardly turned radial flange 11. Each tongue 10 is provided with an opening 12 substantially in circumferential alignment with the circumferential edge 7 of cover 6. This opening 12 is readily formed by slitting tongue 10 as at 13 and then pressing the portion of the tongue between the slit 13 and the flange 11 of tongue 10 outwardly to form a socket portion 14.

To assemble the cover plate to the wheel it is merely necessary to hook one of the flanged tongues 10 over one of the circumferential edges 5 of the wheel body and then press the cover 6 toward the wheel body until the flange 11 of the diametrically opposite tongue 10 snaps over the diametrically opposite circumferential edge portion 5. In pressing the cover 6 toward the wheel to snap or fasten it into position, rubber pads 9 are placed in compression (Fig. 5) and thus draw the flanges 11 tightly against the edge portions 5 of the wheel body. Further, the cover plate 6 is made of a spring resilient metal or plastic and arranged so that when it is disassembled from the wheel the distance between the inside faces 15 of tongues 10 is slightly less than the external diameter of the wheel between arcuate edge portions 5 so that when the cover 6 is assembled to the wheel, tongues 10 are in tension and therefore tend at all times to draw the opposed flanges 11 toward each other. This materially aids in locking the cover plate to the wheel body and assists in holding it thereon in rattle-proof condition.

Cover 6 can be readily released from the wheel by inserting the operating end of a screw-driver 16 through opening 12 into socket 14 (Fig. 3) and then prying tongue 10 and flange 11 radially outwardly (Fig. 4) by using screw-driver 16 as a lever and swinging it downwardly about the lower edge of opening 12 as a fulcrum. The lower edge of opening 12 is, of course, supported by the wheel body and by prying one tongue 10 radially outwardly, as indicated in Fig. 4, flange 11 is disengaged from edge 5 of the wheel body and this causes the cover 6 to move outwardly of the wheel body whereby the diametrically opposed tongue 10 and flange 11 will disengage the edge 5 of the wheel and the cover plate will be released from the wheel. Whenever one of the tongues 10 is disengaged from an edge 5 of the wheel body, rubber pads 9 being in compression, as shown in Fig. 5, will tend to move the cover plate 6 outwardly or away from the wheel body 1, as illustrated in Fig. 6. If the upper tongue 10 is released, as illustrated in Fig. 4, then as the cover moves outwardly from, and downwardly upon, the wheel body the lower tongue 10 will simultaneously be released or disengage the edge 5 of the wheel body.

I preferably make my cover 6 of a sheet metal stamping with ordinary or stainless steel and therefore tongues 10, which are integral therewith, will be inherently resilient or have spring qualities. It is essential that tongues 10 should be resilient or have spring qualities in order to resiliently interengage the arcuate edge portions 5 of the wheel body to releasably secure the cover to the wheel body.

From the above description it is evident that my cap will mount on existing wheels in their present form without extra manufacturing operations or the addition of extra parts such as spring clips, buttons, or bumps commonly used on the vehicle wheels today for securing the cover thereto.

My cover can be made of lighter material than the presently used hub caps or wheel covers because the latter must of necessity be made of heavier construction so that they will not distort in shape when they are forcibly secured to, or removed from, the wheel.

In the assembly of my cover 6 to the wheel it will be noted that tongue portions 10 form a hook which hooks over the peripheral edge of the wheel body 1.

In the form shown in Fig. 8 the cover 20 is arranged to hook on to the rim 2 of the vehicle wheel. To this end cover 20 is provided with diametrically opposed tongues 21 which terminate in radially outward flanges 22. Thus, tongues 21 and flanges 22 serve as hooks for hooking the cover to rim 2, as shown in Fig. 8. The outside circumference of cover 20 will be substantially the same as the inner circumference of rim 2 and here again hooks 22 will be resilient because they are made of spring metal or steel integral with cover 20.

To facilitate releasing of cover 20 from rim 2, each hook portion 21 is provided with a depression or inwardly formed portion 23 which provides a clearance between the inner face of rim 2 and the cover 20 for insertion of a tool, such as a screw driver 16, Fig. 11. By prying upwardly on screw driver 16, Fig. 11, hook 21 will be sprung downwardly thereby disengaging flange 22 from the inside face 25 of rim 2 and permitting removal of the cover from the wheel. Here again the cover is simply hooked on the wheel rim to secure the cover to the wheel and is unhooked preparatory to removing the cover from the wheel.

I claim:

1. A cover for a vehicle wheel having at least two axially extending and circumferentially spaced resilient tongues at the peripheral edge thereof, said tongues having radial flanges at the end thereof adapted to hook behind a radial edge of said wheel, one of said tongues having a socket formed therein accessible from the outer side of said cover whereby a prying tool can be inserted into said socket from the outer side of the cover and used as a lever to pry said tongue in a radial direction away from said radial edge of said wheel and thereby disengage said radial flange from behind said radial edge of said wheel.

2. The combination claimed in claim 1 including a plurality of circumferentially spaced rubber pads located on the inside face of said cover adjacent the circumference thereof, said pads being in compression between the inside face of the cover and the outside face of the wheel body when the cover is assembled to the wheel body.

3. The combination claimed in claim 1 including elastic means located on the inside face of said cover adjacent the circumference thereof, said elastic means being in compression between the inside face of the cover and the outside face of the wheel body when the cover is assembled to the wheel body.

4. The combination set forth in claim 1 wherein said cover is a concave resilient member and said tongues are integral therewith.

5. The combination set forth in claim 1 wherein said flanges extend radially inwardly and are adapted to engage behind a radial edge on the wheel body.

6. A cover for a vehicle wheel comprising a concave disc having at least two axially extending and circumferentially spaced resilient tongues at the peripheral edge thereof adapted to overlie axially extending portions of the wheel, said tongues having radial flanges at the end thereof adapted to hook behind a radial edge portion on said axially extending portion of said wheel, one of said tongues having a socket formed therein accessible from the outer side of said cover and providing an opening between said tongue and said axially extending portion of said wheel whereby a prying tool can be inserted into said socket from the outer side of said wheel and used as a lever to pry said tongue radially away from said radial edge of said wheel and thereby disengage said radial flange from behind said radial edge portion.

7. A cover for a vehicle wheel having at least two circumferentially spaced resilient tongues at the peripheral edge thereof, said tongues being inclined to the general plane of said cover and having flanges at the end thereof extending perpendicularly to the plane of said tongues, said flanges being adapted to hook behind an edge portion of said wheel, one of said tongues having a socket formed therein accessible from the outer face of the cover whereby an instrument may be inserted into said socket from the outer side of the wheel and used as a lever to pry said tongue in a direction perpendicular to the plane of said tongue and away from said edge portion of said wheel and thereby disengage said flange from behind said edge portion.

8. The combination set forth in claim 7 wherein said flanges extend in a direction inwardly of the wheel and are adapted to hook behind an edge portion of the wheel body.

9. The combination set forth in claim 7 including a plurality of circumferentially spaced rubber pads on the inside face of said cover adjacent the peripheral edge thereof, said pads being compressed between the inside face of the cover and the outside face of the wheel body when the cover is assembled on said wheel.

10. The combination set forth in claim 8 wherein said socket comprises an opening in said tongue accessible from the outer side of said cover whereby an instrument may be inserted through said opening and the tongue and used as a lever to flex said tongue in a direction outwardly of the wheel to disengage said flange from behind said edge portion.

11. The combination as set forth in claim 1 including a plurality of circumferentially spaced rubber pads on the inside face of said cover adjacent the peripheral edge thereof, said pads being compressed between the inside face of the cover and the outside face of the wheel body when the cover is assembled on the wheel.

12. A cover for a wheel including a rim having at least two circumferentially spaced resilient hooks adapted to interengage the rim of the wheel to releasably secure the cover to the wheel, the said cover having substantially the same outer diameter as the inner diameter of the wheel rim, said cover being provided with a depression in one of said hooks whereby an instrument may be inserted in the depression adjacent the inner face of the wheel rim and the hook sprung radially inwardly to disengage the hook from the wheel rim.

WILLIAM P. HENDERSON.

REFERENCES CITED

The following references are of record in the file of this patent:

UNITED STATES PATENTS

| Number | Name | Date |
|---|---|---|
| 1,878,441 | Green | Sept. 20, 1932 |
| 2,016,395 | Sinclair | Oct. 8, 1935 |
| 2,020,885 | Gatta | Nov. 12, 1935 |
| 2,127,220 | Horn | Aug. 16, 1938 |
| 2,159,881 | Booth | May 23, 1939 |
| 2,174,087 | Horn | Sept. 26, 1939 |
| 2,186,550 | Lyon | Jan. 9, 1940 |
| 2,231,931 | Lyon | Feb. 18, 1941 |
| 2,358,468 | Mulhern | Sept. 19, 1944 |
| 2,368,245 | Lyon | Jan. 30, 1945 |